United States Patent [19]

Campbell et al.

[11] Patent Number: 5,447,702
[45] Date of Patent: Sep. 5, 1995

[54] FLUID BED DESULFURIZATION

[75] Inventors: William M. Campbell, Houston; Gunnar B. Henningsen, Sugar Land, both of Tex.

[73] Assignee: The M. W. Kellogg Company, Houston, Tex.

[21] Appl. No.: 206,569

[22] Filed: Mar. 4, 1994

Related U.S. Application Data

[63] Continuation-in-part of Ser. No. 90,420, Jul. 12, 1993, abandoned, and a continuation-in-part of Ser. No. 90,601, Jul. 12, 1993, abandoned.

[51] Int. Cl.$^6$ .......................... C10K 1/26; B01D 53/52
[52] U.S. Cl. .................. 423/230; 48/197 R; 502/39; 502/41
[58] Field of Search ............. 48/197 R, 206, 210; 423/230; 502/38, 39, 41

[56] References Cited

U.S. PATENT DOCUMENTS

| | | | |
|---|---|---|---|
| 3,969,089 | 7/1976 | Moss et al. | 48/197 R |
| 4,026,679 | 5/1977 | Collin | 48/197 R |
| 4,180,549 | 12/1979 | Olsson et al. | 423/230 |
| 4,374,105 | 2/1983 | Anderson et al. | 423/230 |
| 4,444,568 | 4/1984 | Beisswenger et al. | 48/197 R |
| 4,539,188 | 9/1985 | Hirsch et al. | 423/230 |
| 4,579,070 | 4/1986 | Lin et al. | 110/345 |
| 4,613,344 | 9/1986 | Henrich et al. | 48/210 |
| 4,732,888 | 3/1988 | Jha et al. | 423/230 |
| 4,857,285 | 8/1989 | Gal | 423/230 |
| 4,867,706 | 9/1989 | Patel | 48/197 R |
| 5,213,587 | 5/1993 | Ekstrom et al. | 48/197 R |

OTHER PUBLICATIONS

Campbell, Operating Experience with FBC's in the Petroleum Industry, EPRI Seminar Palo Alto, Calif. 1988, May.
Campbell, Development of a Transport Mode Pressurized Circulating Fluid Bed Combustor, Power Generation '88 Conf, Dec. 1988.
O'Donnell, "An Advance Concept in pressurized Fluid Bed Combustion", American Society of Merchanical Engineers (ASME); pp. 183–191, 1991.
Pitcher et al., "The Pinon Pine Project," Foster Wheeler USA Corp., Sierra Pacific Power Co. and M. W. Kellogg Co., 1991.
Poole et al., "The Pinon Pine IGCC Project Overview and Update," Ninth Annual International Pittsburgh Coal Conference, 13 Oct., 1992.
Gbordzoe et al., "Development of the M. W. Kellogg's Pressurized Transport Combustor for Power Applications," Pittsburgh Coal Conference, 13 Oct. 1992.
Ayala et al., "Enhanced Durability of High-Temperature Desulfurization Sorbents for Moving-Bed Applications," GE Corporate Research and Development, Schenectady, New York, May 1992, DE-AC21-88MC25003.
Motter, "Status of the Pinon Pine IGCC Project," Sierra Pacific Power Co., 12 Aug. 1992.
Morgantown Energy Technology Center, "Fluid-Bed Hot-Gas Desulfurization Process Development Unit," U.S. Department of Energy. (no date).

*Primary Examiner*—Peter Kratz
*Attorney, Agent, or Firm*—The M. W. Kellogg Company

[57] ABSTRACT

A method and apparatus for desulfurizing a gas and regenerating a sorbent is disclosed. The sulfur-containing feed gas which can be an effluent gas from a coal gasification reactor, for example, is desulfurized with a particulated metallic oxide sorbent in a transport riser. The sulfided sorbent is than separated from a desulfurized effluent gas and regenerated by contact with an oxygen-containing gas in a transport riser. The regenerated sorbent is separated from an $SO_2$ containing offgas and recycled to the desulfurization step. The degree of sorbent conversion in the desulfurization step is held at a low level and the sorbent regeneration rate is increased to avoid excessive temperature rise in the regeneration step. In such manner, sorbent cooling can be substantially eliminated. The regeneration riser preferably comprises a once-through lift riser to minimize the riser transport gas requirements to just oxidant gas or oxidant gas mixed with a reduced amount of diluent gas. A reduction in use of diluent gas give a relatively high offgas $SO_2$ concentration of as much as 15 mole percent, suitable for sulfuric acid manufacture and/or reduction to sulfur.

6 Claims, 2 Drawing Sheets

FLUID BED DESULFURIZATION

CROSS-REFERENCE TO RELATED APPLICATION

This application is a continuation-in-part of U.S. Ser. No. 090420, filed Jul. 12, 1993, and now abandoned by G. Henningsen, S. Katta, G. K. Matbur and W. M. Campbell for Coal Gasification and Sulfur Removal Process. This application is also a continuation-in-part of U.S. Ser. No. 090601, filed Jul. 12, 1993, and now abandoned bY G. B. Henningsen, W. M. Campbell, E. A. Gbordzoe and Y. Y. Lin, for A Transport Gasifier.

FIELD OF THE INVENTION

The present invention relates to a method of fluid bed desulfurization using a regenerable sorbent, and more particularly to a fluid bed desulfurization method wherein a sorbent regeneration offgas can have a sulfur dioxide concentration suitable for sulfuric acid manufacture, or reduction to sulfur.

BACKGROUND OF THE INVENTION

Fluid bed desulfurization using a zinc-based metallic oxide sorbent is known in the art. Typically, a fuel gas produced by gasification of fossil fuels contains sulfur compounds which must be removed before the fuel gas can be utilized. To effect sulfur clean-up, the sulfur-containing fuel gas is contacted with a particulated metallic oxide sorbent at an elevated temperature. These gas-solids reaction systems conventionally employ a fixed or fluid bed reactor. Reaction between the sulfur and the sorbent desulfurizes the fuel gas and produces a spent sulfided sorbent. The spent sorbent is then regenerated for sulfur absorption by reaction with an oxidant gas, e.g. air at an elevated temperature to produce a sulfur dioxide-containing offgas. Typically, the offgas is then reacted with lime to form sulfate to complete the sulfur clean-up.

Metallic oxide sorbents are known to undergo attrition at elevated temperatures as the chemical and physical sorbent structure becomes degraded. To avoid excessive sorbent degradation through repeated absorption-regeneration cycles, the reaction temperature of the sulfur absorption and sorbent regeneration reactions must generally be held below about 650°– C.760° C. Control of the sulfur absorption reaction temperature has not generally been a problem since the sulfur absorption reaction generates only a small amount of heat. However, control of the regeneration reaction temperature is more difficult because the sulfur regeneration reaction is highly exothermic. To avoid an excessive regeneration reaction temperature which can damage the sorbent, the regeneration reaction rate must be limited. Generally, this entails the use of a diluent gas such as nitrogen and/or steam in the oxidant gas to absorb generated heat and lower oxidant (oxygen) concentration, a sorbent cooler or a combination of both.

There are several drawbacks to the use of a diluent gas in sorbent regeneration. A diluent gas increases the volumetric throughput in the regenerator reactor. Vessel size of the regenerator train must be increased in order to maintain a desired residence time. Sulfur dioxide concentration of the offgas becomes too low for further high value-added application such as the manufacture of sulfuric acid and/or reduction to sulfur. Use of a sorbent cooler is undesirable due to additional capital costs involved.

It would be advantageous to operate a zinc-based metallic oxide desulfurization process in a manner, which substantially reduces or eliminates the need for a diluent or for sorbent cooling in the sorbent regeneration mode, and which produces an offgas having a sulfur dioxide concentration that can be suitable for use in sulfuric acid manufacture and/or reduction to sulfur.

Ayala et al., "Enhanced Durability of High-Temperature Desulfurization Sorbents for Moving-Bed Applications," GE Corporate Research and Development, Schenectady, N.Y. May 1992, DE-AC21-88MC25003 describes the development of chemically active and mechanically durable zinc ferrite and zinc titanate sorbent formulations which are suitable for moving-bed, high temperature, coal gas desulfurization processes.

Morgantown Energy Technology Center, "Fluid-Bed Hot-Gas Desulfurization Process Development Unit," U.S. Department of Energy, describes the use of a fluid-bed hot gas desulfurization (HGD) process development unit (PDU) in an integrated gasification combined cycle (IGCC) system involving the continuous circulation of a desulfurization sorbent such as zinc titanate, zinc ferrite or other materials between an absorber and a regenerator. In the absorber, the sorbent becomes sulfided as a result of removing sulfur species from a fuel gas stream. In the regenerator, the captured sulfur in the sulfided sorbent is oxidized with air to restore the sorbent activity and yield $SO_2$.

SUMMARY OF THE INVENTION

By limiting the sulfur content of a spent sorbent feed from a desulfurizer stage to a sorbent regeneration stage of the desulfurization method of the present invention, the reaction rate and temperature rise in the sorbent regeneration stage can be controlled substantially without the use of a diluent gas or sorbent cooling. Thus, an offgas comprising a near-stoichiometric concentration of sulfur dioxide useful in sulfuric acid production and/or reduction to sulfur can be produced. In addition, reduced temperature rise in the regeneration step can extend sorbent performance longevity and reduce sorbent inventory. By contrast, in the prior art the offgas sulfur dioxide concentration is typically too dilute for sulfuric acid production. Such gas is ordinarily scrubbed instead, producing a solid waste which must be disposed of.

In one embodiment, the present invention provides a method for desulfurizing a gas and regenerating a sorbent. In one step, a feed gas is desulfurized with a particulated metallic oxide sorbent in a transport riser to form an effluent gas of reduced sulfide content. As another step, partially sulfided sorbent is separated from the effluent gas to form a product gas stream essentially free of sorbent particles. The sulfided sorbent is regenerated by contact with an oxygen-containing gas to form a sulfur dioxide-containing regeneration offgas. The regenerated sorbent is separated from the regeneration offgas to form an offgas stream essentially free of the sorbent. The regenerated sorbent is recycled to the desulfurization step. The partially sulfided sorbent preferably comprises less than 5 weight percent sulfur and more preferably from about 1 to about 2 weight percent sulfur. The regeneration offgas preferably comprises about 10 or more mole percent sulfur dioxide up to a stoichiometric concentration of approximately 15 mole percent. The regeneration step is preferably effected in a regeneration transport riser. The desulfurization and regeneration steps can be single pass with respect to the sorbent, and the respective feed and regeneration gases. Alternatively, a primary portion of the partially sulfided sorbent can be recirculated to the desulfurization step and a secondary portion fed to the regeneration step. The method can include, if desired, a sorbent cooling step. A temperature rise of the regeneration gas in the regeneration step is preferably from about 140° to about 195° C. (about 250° to about 350° F.).

In another embodiment, the present invention provides a desulfurization unit. The unit comprises a transport riser adapted for mixing and contacting a feed gas containing sulfide with a particulated metallic oxide sorbent and producing an effluent gas of reduced sulfide content. A first separation zone is adapted for recovering partially sulfided sorbent from the effluent gas and forming a product gas stream essentially free of sorbent particles. A regeneration vessel is adapted for contacting partially sulfided sorbent with an oxygen-containing gas at sorbent regeneration conditions to regenerate the sorbent and form a sulfur dioxide-containing offgas. A second separation zone is adapted for recovering regenerated sorbent from the offgas to form a regeneration offgas stream essentially free of sorbent particles. The unit includes a line for transferring regenerated sorbent recovered from the second separation zone to the transport riser and a charge of metallic oxide sorbent for substantially continuous operation of the transport riser, regeneration vessel and separation zones.

The regeneration vessel of the desulfurization unit preferably comprises a transport riser for mixing the sulfided sorbent and oxygen-containing gas for regeneration of the sorbent in a reaction zone at transport hydrodynamic conditions. Sorbent transfer lines are preferably included from the first separation zone to the regeneration vessel and from the second separation zone to the desulfurization transport riser for operation of the regeneration vessel and desulfurization riser in single-pass mode.

Alternatively, the desulfurization unit preferably comprises a holdup zone for receiving partially sulfided sorbent from the first separation zone, a line for recirculating a first portion of the sorbent from the holdup zone to the desulfurization transport riser, and a line for transferring a second portion of the sorbent from the holdup zone to the regeneration vessel. A source of reducing gas is preferably included for pneumatically conveying regenerated sorbent in the transfer line to the desulfurization riser. A heat exchanger can be included, if desired, for cooling regenerated sorbent.

In another embodiment, the present invention provides a method for desulfurizing a gas comprising the step of feeding the gas to the desulfurization unit described above and operating the unit to remove sulfides from the feed gas and produce an offgas containing sulfur dioxide. The oxygen-containing regeneration gas preferably comprises undiluted air and the offgas preferably comprises 15-18 mole percent sulfur dioxide.

DETAILED DESCRIPTION OF THE INVENTION

Sulfur loading of a sorbent in the desulfurizer stage of the present desulfurization method is limited to a low level well below a saturation concentration to control subsequent reaction rate of the sorbent regeneration stage and prevent excessive temperature rise in the sorbent regenerator.

Figure 1:
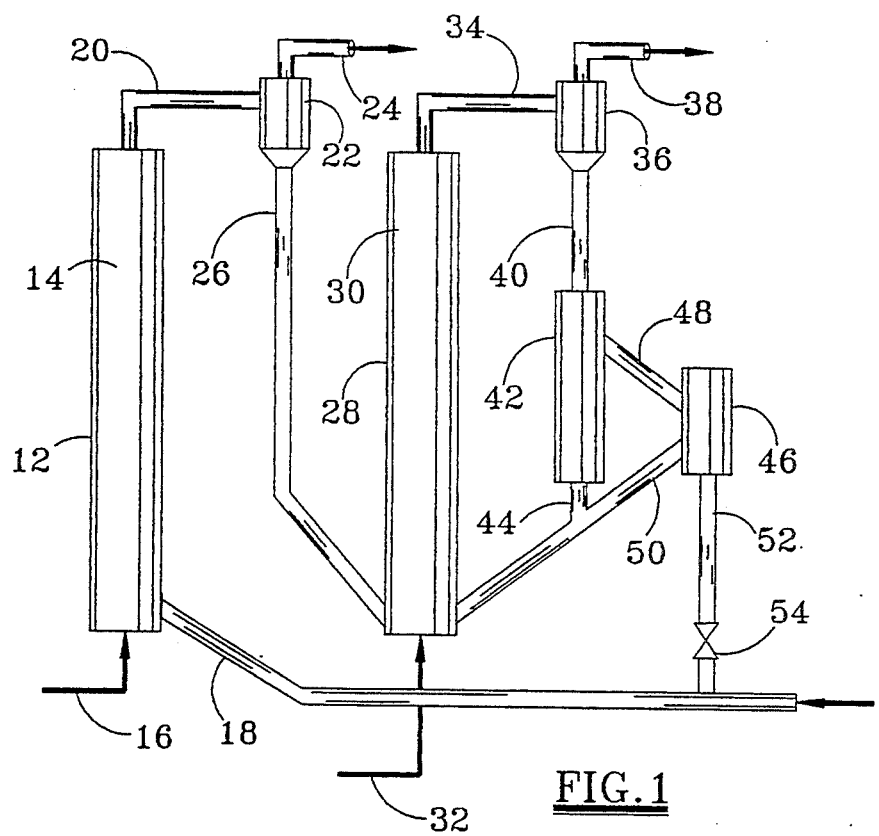
FIG. 1 is a schematic diagram of a fluid bed desulfurizer of the present invention comprising a transport sulfur absorber with a once-through riser and a transport sorbent regenerator including sorbent recirculation and cooling.
Figure 2:
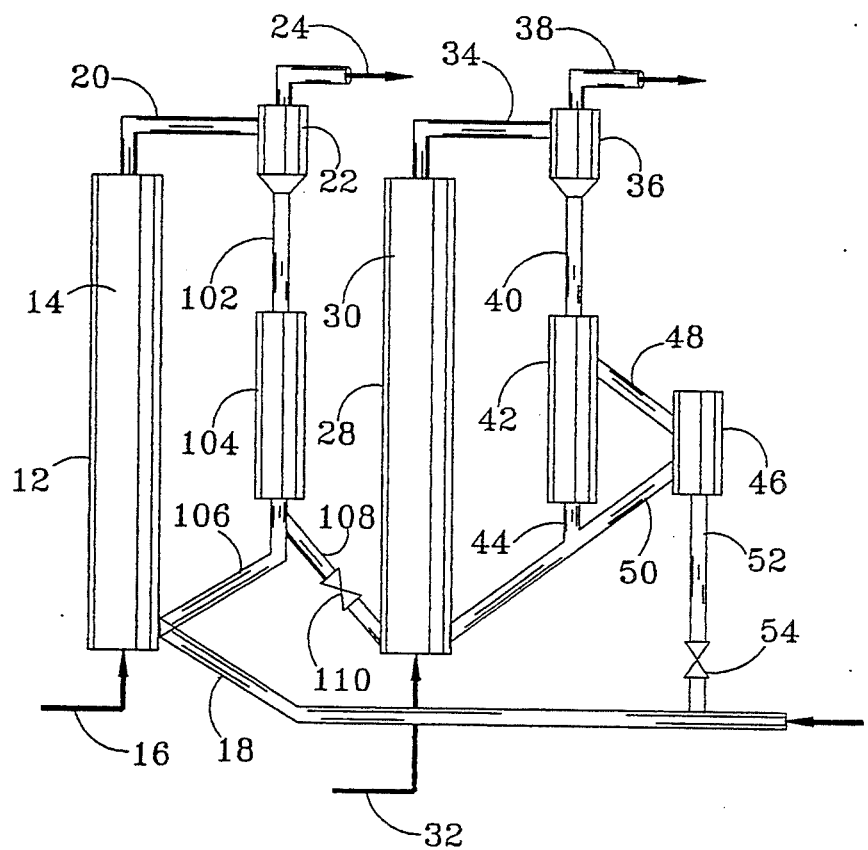
FIG. 2 is a schematic diagram of an alternate embodiment of a fluid bed desulfurizer of the present invention including sorbent recirculation in the transport absorber.
Figure 3:
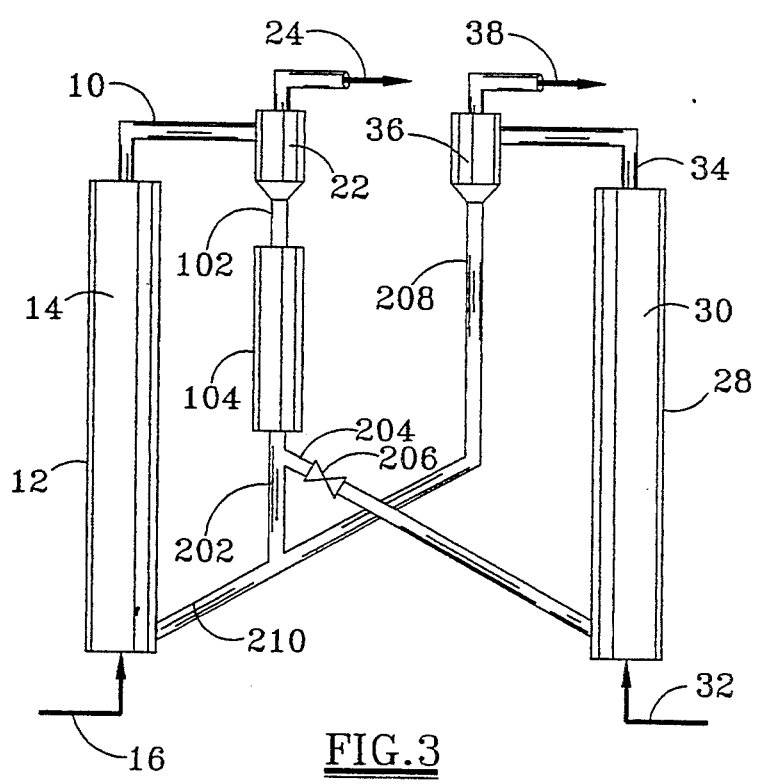
FIG. 3 is a schematic diagram of an alternate embodiment of a fluid bed desulfurizer of the present invention, wherein the sorbent regenerator comprises a once-through lift riser without sorbent cooling.

Referring to FIGS. 1-3 wherein like numerals indicate like parts, a transport sulfur absorption/regeneration unit comprises a transport absorber 12 having a riser 14 operated as a single-pass lift riser for both incoming gas and sorbent. In the riser 14, an $H_2S$-containing gas introduced through feed line 16 is contacted with sulfur sorbent particles introduced through line 18. The absorber 12 operates in the transport hydrodynamic range preferably at the pressure and temperature of the feed gas in line 16.

The absorption of $H_2S$ by the metallic sorbent results in the formation of a metallic sulfide and water. This reaction is typically of low heat release and the sorbent feed rate is great enough combined with limited absorber recirculation in the riser 14 to ensure a relatively low sulfur pick-up rate per pass on the sorbent. The sorbent sulfur pick-up rate per pass is preferably less than 5 percent by weight of the sorbent, more preferably between about 1 and about 2 percent by weight of the sorbent.

Desulfurized gas containing entrained sorbent particles passes from the absorber riser 14 through line 20 into a gas-solids separator 22 (generally a cyclone separator). A desulfurized product gas which is substantially sorbent-free is removed through line 24. Separated sorbent particles flow through line 26 to a transport regenerator 28. The regenerator 28 has a riser 30 wherein the net sulfur loaded on the sorbent is oxidized to sulfur dioxide by an oxidant supply (generally air plus any diluent) introduced through line 32. A sulfur dioxide offgas containing entrained regenerated sorbent particles passes from the regeneration riser 30 through line 34 to a gas-solids separator 36 (generally a cyclone separator). A substantially particulate-free sulfur dioxide offgas is removed through line 38 for recovery and/or any further use, such as in a sulfator and/or for the synthesis of sulfuric acid. The regenerated sorbent particles recovered in the separator 36 pass through line 40, into a dense-phase standpipe 42 for recycle through lines 44 and 50 to the regenerator 28.

The regeneration reaction is highly exothermic, and if desired, heat can be removed by means such as a sorbent cooler 46, a diluent gas in the oxidant supply, or a combination thereof. As seen in FIGS. 1-2, a portion of sorbent from the standpipe 42 is circulated to a sorbent cooler 46 through line 48 and fed through line 50 with recycled sorbent from the standpipe 42 and line 44 at a sufficient mass recirculation rate to maintain the desired temperature on the sorbent. A portion of the cooled, regenerated sorbent is removed from the sorbent cooler through line 52 and recycled to the absorber 122 through line 18 as mentioned earlier. The recycle sorbent is typically transported to the absorber 12 by a reducing gas, containing hydrogen for example, or a slipstream of the product gas, to react with any residual sulfate in the sorbent. A plug valve 54 or similar type control/shutoff valve controls the rate of sorbent circulation in the desulfurization unit 10.

As seen in FIG. 2, the present invention can incorporate sorbent recirculation in the absorber 12. Partially sulfated sorbent particles separated from the product gas in the cyclone separator 22 pass through line 102 into a dense-phase standpipe 104 for recycle through line 106 to the absorber 12. A portion of the sorbent particles in line 106, typically minor, is diverted through line 108 by means such as a solids valve 110 to the transport regenerator 28.

Referring to FIG. 3, the present invention can operate the transport regenerator 28 as a once-through lift riser without regenerator sorbent recirculation and cooling. A generally minor portion of the partially sulfated sorbent particles exiting from the absorber standpipe 104 through line 202 are diverted through line 204 to the regenerator 28. A solids plug valve 206 or the equivalent is used to control the regenerator 28 sorbent feed rate. Partially regenerated sorbent particles recovered in the separator 36 from the $SO_2$ offgas pass through line 208, are combined with the recirculating sorbent in line 202 and are fed together through line 210 to the absorber 12.

Since the quantity of sorbent diverted from the absorber 12 to the regenerator 28 is a function of the feed gas sulfur content and the sorbent loading, higher sulfur equilibrium loading in the absorber 12 results in a lower sorbent diversion rate, but can increase the regeneration exotherm. However, by increasing the diversion rate of loaded sorbent from the absorber 12 to a rate corresponding to an incremental oxidation per pass in the regenerator 28 such that the resulting exotherm approximately 55°–85° C. (100°–150° F.) does not exceed the maximum desired sorbent regeneration temperature, the regenerator 28 can be operated as a once-through lift riser. Operation of the regenerator riser 30 as a single pass riser can eliminate the need for the sorbent cooler 46 and minimize the riser transport gas requirements to just oxidant. Increased spent sorbent diversion rates require that the sorbent loading be kept at a low level, e.g. about 1–2 percent sulfur by weight of the sorbent. In addition, oxygen content of the oxidant is preferably maintained at an oxygen deficient condition. As a result, the sorbent is never saturated nor totally regenerated.

The advantages of the present desulfurization, particularly the FIG. 3 embodiment of a single-pass regeneration, are smaller diameter vessels as compared to bubbling and turbulent operating modes, longer sorbent life, lower sorbent inventory and the substantial elimination of sorbent cooling and diluent addition. Furthermore, by avoiding excessive diluent addition, the offgas in line 38 can have a relatively high sulfur dioxide concentration (as much as 16–17% $SO_2$) suitable for sulfuric acid manufacture.

The absorber 12 operates at a temperature suitable for absorbing sulfides from the fuel gas using a metallic oxide sorbent and at a pressure which depends on the reactor operating regime (e.g. bubbling bed, fast bed and pneumatic transport). The absorber is generally operated at a temperature of from about 500° C. to about 600° C. and at ambient pressure up to about 2000 kPa. The regenerator operates at a temperature lower than a maximum sorbent operating temperature. The regenerator maintained at a temperature less than 700° C. and at a pressure similar to the absorber pressure.

The present fluid bed sulfur absorber and sorbent regenerator can be operated in any of the fluid bed operational modes including bubbling bed, fast bed, pneumatic transport, and the like. Differences in operating modes are well known in the art including bed particle size and fluid velocity in the reactor. As seen in FIGS. 1–3, the transport operational mode is preferred.

Feed gas to a sulfuric acid plant desirably comprises about 12 percent by weight sulfur dioxide. Typically, without air or steam dilution, near-stoichiometric operation of the regenerator 28 will produce an offgas stream in line 38 comprising nearly 15 percent by volume $SO_2$. Air and any diluent gas can be added to the oxidant at a sufficient quantity to produce an offgas in line 38 having an $SO_2$ concentration suitable for sulfuric acid manufacture.

Design basis for the desulfurization unit of the present invention is preferably less than 20–30 ppm $H_2S$ in the desulfurized gas. The metallic oxide catalyst preferably comprises zinc oxide, zinc ferrite, zinc titanite, and the like or a combination thereof.

The present invention can be further illustrated by reference to the following examples.

Examples

A transport fluid bed reactor test unit (TRTU) was used to show the applicability and performance of a fluid bed reactor to the absorption/regeneration of sulfur using a zinc oxide-based sorbent according to the present invention having rigid, durable solid form and a sulfur absorption capability similar to that of zinc ferrite. Other sorbent properties included a bulk density of 1.0 g/cc, a true density of 1.6 g/cc. The sorbent particle size distribution before and after use is given in Table 1.

TABLE 1

| Average Particle Size ($\mu$) | Initial Distribution (wt %) | Final Distribution (wt %) |
| --- | --- | --- |
| 297+ | 0.05 | 0.08 |
| 274 | 17.15 | 13.88 |
| 214 | 48.81 | 52.05 |
| 176 | 17.20 | 16.52 |
| 125 | 13.02 | 11.70 |
| 88 | 1.97 | 3.41 |
| 62 | 0.51 | 0.34 |
| 44 | 0.78 | 0.61 |
| 31 | 0.51 | 0.41 |
| 2.8 | — | 0.20 |
| 1.9 | — | 0.17 |
| 1.4 | — | 0.48 |

Figure 4:
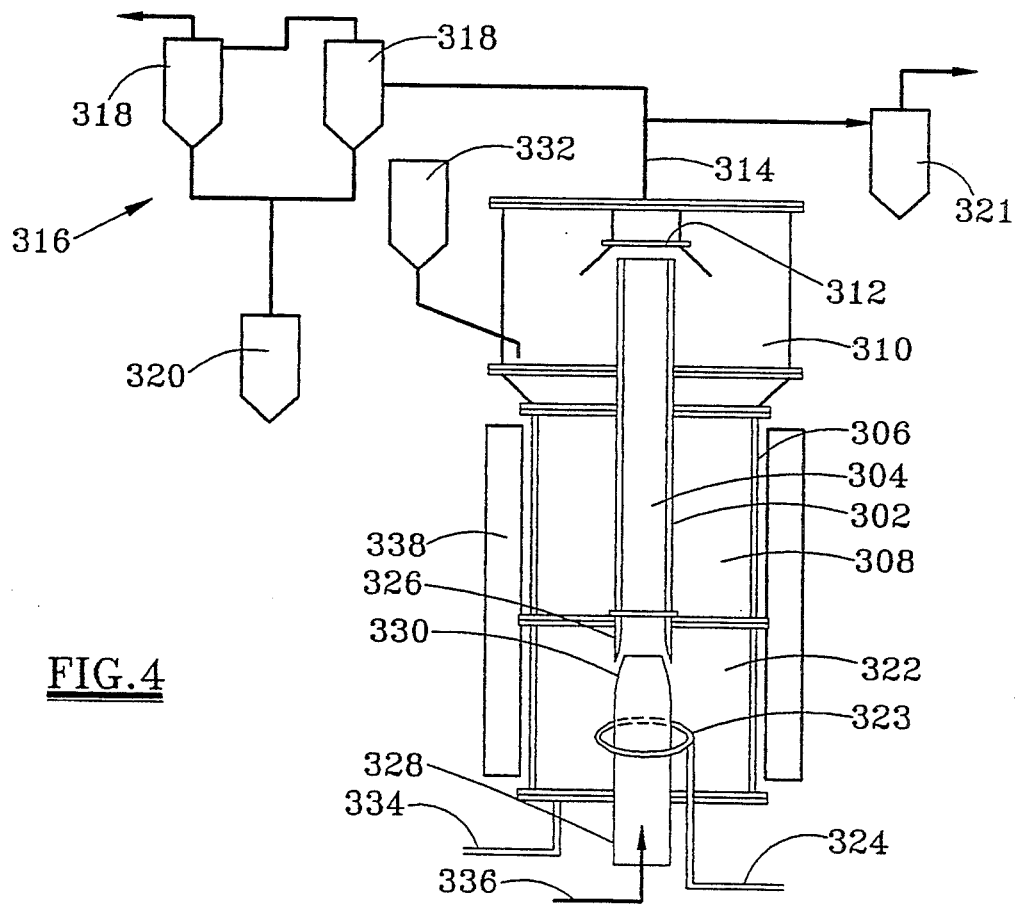
FIG. 4 is a schematic diagram of a small-scale transport fluid bed sulfide sorbent absorber/regenerator used in the examples below to demonstrate the utility of the present method.

A generalized diagram of the TRTU is shown in FIG. 4. The TRTU had a central riser pipe 302 having an inner reaction zone 304. The riser pipe 302 was jacketed by a standpipe 306 forming an annular sorbent accumulation zone 308. A sorbent disengagement zone 310 at the outlet of the riser pipe 302 disengaged the fluidized sorbent from the product gas by means of an inertial strike plate 312. Product gas was removed from the disengagement zone through line 314 for analysis by conventional means (not shown). A dust collection zone 316 comprising cyclone separators 318 was used to further separate residual sorbent from the product gas.

The collected sorbent was stored in a holding vessel 320 or storage hopper 321.

A sorbent fluidizing zone 322 at the inlet of the riser pipe 302 established a fluidized bed of sorbent. The sorbent was fluidized by a fluidizing gas which was sparged into the fluidizing zone 322 by a sparger 323 at the outlet of a sparge gas line 324. The sorbent thus fluidized was injected into the inlet of the riser pipe 302 by an eductor 326. An inlet pipe 328 having a variable cone valve 330 at an outlet thereof supplied feed gas to the unit 300. The feed gas also served as an eduction gas to the eductor 326. The eductor 326 was adjustable to control the velocity of gas through the riser 302.

The unit 300 included a sorbent supply hopper 332, a drain line 334 and a feed gas inlet line 336. The unit included electric heating units 338 jacketing the standpipe 306, a cooling water jacket (not shown) on the riser pipe 302 and an idle feed gas line (not shown).

Two different but similarly structured reactor models were built. A cold flow model was made of a clear plastic. The cold flow model was designed to observe the fluidization of the sorbent in air. The cold flow model did not have heating jackets and the riser cooling jacket. The purge, fluidizing and test (educting) gas were compressed air. The cold flow model had a riser 302 which was 7.01 m (23 ft) tall and a riser flow area of 1.30 cm$^2$ (0.0014 ft$^2$). The annular flow area of the standpipe 306 was 36.23 cm$^2$ (0.039 ft). Further, the cold flow reactor had a shut off valve (not shown) installed in the middle of the sorbent accumulation zone 308 (standpipe annulus) for accumulating the circulating solids and determining the slip of solids relative to gas in the riser.

A hot flow model suitable for high temperature operation was made from INCONEL 800HT. The hot flow model was designed to demonstrate sulfur absorbence in a transport reactor. The hot flow model included the heating jacket 338 comprising six sections of heating elements, the riser, and the idle flow line (not shown). The hot flow reactor did not include the annulus shut off valve. The hot flow reactor had a riser 302 which was 9.14 m (30 ft) tall and a riser flow area of 1.95 cm$^2$ (0.0021 ft$^2$). The annular flow area of the standpipe 306 was 41.99 cm$^2$ (0.0452 ft$^2$). The purge and fluidizing gases were compressed nitrogen. The inlet test gas was a mixture of compressed gases comprising up to 8 volume percent H$_2$S and the balance nitrogen.

The hot flow reactor was reconfigured for sorbent regeneration by supplying spent sorbent through the solids feed hopper 332 and feeding an oxidant supply comprising air diluted with nitrogen through the feed line 336.

A Draeger tube was used for determining both the H$_2$S and SO$_2$ concentration levels of the hot outlet gas (in either absorption or regeneration). An on-line GC was installed to detect the oxygen breakthrough in the course of the sorbent regeneration.

Example 1

Cold flow testing of the fluid bed reactor apparatus 300 described above (in a cold flow arrangement) was conducted to evaluate the sorbent fluidization characteristics for use in a succeeding hot flow test (in a hot flow arrangement).

Approximately 4.55 kg (10 lb) of sorbent was introduced into the annulus before the solids circulation was started. The educting air flowing through the riser was set at 4.6 m/sec (15 ft/sec) which was equivalent to 2.7 actual m$^3$/hr (75 ACFH). The fluidizing air was controlled at about 0.06 m/see (0.2 ft/sec). This created a solid bed height of about 127 cm (50 in.) in the annulus. The corresponding solid circulation was measured to be 113.6 kg/hr (250 lb/hr). The average riser bed density was about 96.1 kg/m$^3$ (6 lb/ft$^3$). Next, an additional 5 kg (11 lb) of sorbent was added to the annulus to raise the solid bed height to 266.7 cm (105 in.). The solids circulation was thus boosted to 268.2 kg/hr (590 lb/hr) and the average riser bed density increased to 200.1 kg/m$^3$ (12.5 lb/ft$^3$).

In the transport mode of operation with a fixed annulus and riser gas velocities as mentioned above, the average riser bed density and solids circulation rate were directly proportional to the annulus bed height. In a 4.5 hour transport mode run, the rate of solid carry-over was found to be 0.4 weight percent.

The cold flow reactor was also run in a bubbling bed mode to measure the bubbling bed height as a function of the fluidization gas velocity with the total solids in the annulus fixed at 9.1 kg (20 lbs). Results with the eductor valve open and the eductor valve closed are given in Table 2. The bubbling bed underwent greater expansion with the eductor closed at an equivalent gas velocity. In a 4.5 hour bubbling bed mode run, the rate of solids carryover was found to be 1.87 weight percent.

TABLE 2

| Fluidization gas velocity (rotometer reading) | Bubbling bed height cm (in.) | |
|---|---|---|
| | Eductor valve open | Eductor valve closed |
| 40 | 267 (105) | 325 (128) |
| 60 | 277 (109) | 381 (150) |
| 80 | 282 (111) | 394 (155) |
| 100 | 300 (118) | 394 (155) |

In view of the stable and uniform bed characteristics, the reactor and sorbent were considered suitable for use in a transport bed desulfurization application.

Example 2

Hot flow operation of the TRTU described above (in a hot flow arrangement) was conducted using the parameters established by the cold flow test. Following pressure and flowmeter testing, the reactor was heated to 540° C. (1000° F.), pressurized to 0.69 MPa(a) (100 psia) and 15.45 kg (34 lbs) of sorbent were charged. The riser temperature was controlled between 540° C. and 570° C. (1000° F. and 1050° F.). The riser gas velocity was set at 4.6 m/sec (15 ft/sec) determined primarily by the requirement of a minimum 2 second gas-sorbent contact time. The fluidization gas velocity was maintained at about 0.05 m/sec (0.175 ft/sec).

Initially, the apparatus was operated without sorbent circulation (i.e. with the eductor valve shut off) to presulfide the riser walls. During the presulfide period, 500 ppm of H$_2$S was introduced into the riser and no H$_2$S was detected at the system outlet. The presulfide period lasted for about 7 hours. A gas sample taken from a location near the riser outlet had an H$_2$S concentration of 360 ppm which accounts for the feed sulfur when dilution goals are included. Following an additional hour for stabilization of the test unit, the eductor valve was opened 6 turns to begin circulating the sorbent. The riser exit bed density was maintained between 144 kg/m$^3$ (9 lb/ft$^3$) and 240 kg/m$^3$ (15 lb/ft$^3$). During the run, the apparatus was operated primarily in a transport mode except for 5 hours in a bubbling bed mode. The H₂S concentration in the feed gas varied between 2000 ppm at the beginning and 8000 ppm near the end to hasten saturation of the sorbent. Table 3 summarizes the operation log. Total run time with sorbent circulation was about 42 hours.

The breakthrough H₂S concentration was 2700 ppm and the sorbent sulfur content was 15.4 weight percent.

Example 3

The spent sorbent produced in Example 2 was regenerated in the TRTU using air diluted with nitrogen as the regeneration oxidant gas. The operating pressure was 0.45 MPa(a) (65 psia), the bed temperature was maintained between 620° C. and 680° C. (1150° F. and 1250° F.). The riser gas velocity remained set at 4.6 m/sec (15 ft/sec) and the fluidization gas velocity remained set at about 0.05 m/sec (0.175 ft/sec). The riser outlet bed density was about 160 kg/m³ (10 lb/ft³). An online GC was used to monitor oxygen in the effluent gas. The regeneration of the sorbent began immediately after the unit was brought to steady state. To prevent the sorbent from being overheated initially, oxygen content of the air was increased incrementally for the first two hours of the regeneration process from 2 to 10 volume percent in even steps then held at 10 volume percent for the remaining 2.5 hours. During the regeneration, the SO₂ content in the riser effluent increased gradually from 0.8 to 3.0 volume percent as analyzed by the Draeger tube. The SO₂ concentration peaked at 3.75 volume percent then dropped to 3.55 volume percent before the oxygen broke through the transport bed at a concentration level of 9.95 volume percent. Sulfur content in the sorbent following regeneration was 0.15 weight percent.

TABLE 3

| Timeline (hour of run) | H₂S conc. in feed gas (ppm) | Comments |
| --- | --- | --- |
| 0-1 | 600-2400 | Linear increasing H₂S concentration. |
| 2-11 | 2400 | Steady H₂S level. |
| 12-16 | | Following 11th hour, the system depressurized and operated at ambient pressure for installation of additional gas sampling ports. |
| 17-18 | 4000 | Repressurized and brought to steady-state. |
| 19-22 | 6000 | Steady H₂S level. |
| 23-32 | 4000 | Steady H₂S level. |
| 33-36 | 2800-6600 | Converted to bubbling bed mode - 3 hrs H₂S concentration linear increasing from 2800 to 3300 ppm; 1 hr H₂S concentration linear increasing from 3300 to 6600 ppm; 1 hr H₂S concentration steady at 6600 ppm. |
| 37-41 | 3600-8000 | Converted back to transport mode - 0.5 hr H₂S concentration linear decreasing from 6600 to 3600 ppm; 2 hr H₂S concentration linear increasing from 3600 to 6200 ppm; 1 hr H₂S concentration linear increasing from 6200 to 8000 ppm. |
| 42 | 8000 | Steady H₂S concentration at 8000 ppm before breakthrough. |

The present transport reactor design utilized much less sorbent and handled a much larger throughput per unit cross-sectional area than a fixed-bed reactor. In addition, the use of a 1-2 second gas-sorbent contact time at 540° C. appeared to be sufficient to ensure an equilibrium H₂S leakage of less than 1 ppmv.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

We claim:

1. In a method for desulfurizing a sulfide-containing feed gas and regenerating a sulfided sorbent wherein the feed gas is contacted with a particulated metallic zinc oxide-based sorbent in a transport absorber riser to form an effluent gas of reduced sulfide content having suspended therein particulated, partially sulfided sorbent; the effluent gas and partially sulfided sorbent are separated to form a product gas stream substantially free of the sorbent; the separated sorbent is regenerated by contacting the sorbent with an oxygen-containing gas in a transport regenerator to form a sulfur dioxide-containing regeneration offgas having suspended therein regenerated sorbent; the regeneration offgas and regenerated sorbent are separated to form an offgas stream essentially free of the regenerated sorbent; and the regenerated sorbent is recycled to the transport absorber riser, the improvement which comprises:

separating the particulated, partially sulfided sorbent removed from the effluent gas into a primary portion and a secondary portion, the secondary portion of partially sulfided sorbent comprising an amount which, when contacted with the oxygen-containing gas in the transport regenerator, results in a reaction exotherm insufficient to produce a temperature in the transport regenerator in excess of a maximum temperature of less than about 700° C.;

regenerating the secondary portion of partially sulfided sorbent by contacting the sorbent with the oxygen-containing gas in the transport regenerator maintained at the maximum temperature of less than about 700° C. in a single pass;

combining the regenerated sorbent with the primary portion of partially sulfided sorbent; and recycling the combined regenerated sorbent and partially sulfided sorbent to the transport absorber.

2. The improved method of claim 1, wherein the partially sulfided sorbent comprises less than 5 weight percent sulfur.

3. The improved method of claim 1, wherein the partially sulfided sorbent comprises from about 1 to about 2 weight percent sulfur.

4. The improved method of claim 2, wherein the regeneration offgas comprises about 10 or more mole percent sulfur dioxide.

5. The improved method of claim 3, wherein the regeneration offgas comprises from about 12 to about 15 mole percent sulfur dioxide.

6. The improvement of claim 1 wherein the reaction exotherm resulting from the contact of the secondary portion of partially sulfided sorbent with the oxygen-containing gas in the transport generator ranges from about 55° C.-85° C.

* * * * *